United States Patent [19]
Goth et al.

[11] Patent Number: 4,505,459
[45] Date of Patent: Mar. 19, 1985

[54] LEAF SPRING ASSEMBLY FOR A VEHICLE

[76] Inventors: John Goth, 58 Lough Ave., Guildford, N.S.W., Australia, 2161; James Goth, 50 Arcadian Circuit, Carlingford, N.S.W., Australia, 2118

[21] Appl. No.: 471,244

[22] Filed: Mar. 2, 1983

[30] Foreign Application Priority Data

Mar. 12, 1982 [AU] Australia .............. PF3080

[51] Int. Cl.³ .............. B60G 11/12; F16F 1/26
[52] U.S. Cl. .............. 267/46; 267/56; 280/682
[58] Field of Search .............. 267/19 R, 19 A, 36 R, 267/46, 63 A, 52, 54 R, 54 A, 54 B, 54 C, 54 D, 54 E, 55, 56, 140.1, 140.3; 280/682; 403/121, 300

[56] References Cited

U.S. PATENT DOCUMENTS

| 1,515,935 | 11/1924 | Dein | 267/56 |
| 1,623,845 | 4/1927 | Kogstrom | 267/56 |
| 2,054,305 | 9/1936 | Stilwell | 267/54 R |
| 2,457,706 | 12/1948 | Neher | 267/140.3 |
| 2,687,269 | 8/1954 | Titus et al. | 267/140.1 |
| 2,758,832 | 8/1956 | Hickman | 267/63 A |
| 2,954,986 | 10/1960 | Boyles | 280/682 |
| 3,361,442 | 1/1968 | Willetts | 280/682 |
| 3,434,734 | 3/1969 | Poulos | 267/56 |
| 3,841,652 | 10/1974 | Higginson | 280/682 |

FOREIGN PATENT DOCUMENTS 1083671 6/1960 Fed. Rep. of Germany ... 267/19 A

Primary Examiner—Douglas C. Butler
Assistant Examiner—R. R. Diefendorf
Attorney, Agent, or Firm—Kirschstein, Kirschstein, Ottinger & Israel

[57] ABSTRACT

A spring assembly for a vehicle having a "slipper" connection between a main leaf spring and a boot comprises a lower additional leaf spring mounted on the boot and having a hooked free end which bears upwards against the end of the main spring, and engages the hooked end of the main spring when the limit of flexing is reached.

3 Claims, 5 Drawing Figures

LEAF SPRING ASSEMBLY FOR A VEHICLE

FIELD OF THE INVENTION

The present invention relates to a spring assembly for a vehicle, particularly a truck or trailer. The assembly is of particular use in the rocker arrangements of multi-axle vehicles, but is not limited thereto.

BACKGROUND TO THE INVENTION

Where trucks have a group of two or more axles with a set of springs for each axle, they normally use some form of rocker arrangement to equalise the load carried by respective leading and trailing springs. The rocker is normally connected to the spring ends either by a pin and shackle arrangement or by the use of a boot through which the spring can slide backwards and forwards and also twist sideways. Where the boot arrangement is used it is normally referred to as a "slipper" connection and a torque arm is used to locate one end of the spring. At the other end of the spring it is normal practice to turn down the end of the lower main leaf to form a hook which is designed to catch on a keeper bolt at the bottom of the boot to prevent the end of the spring from coming out of the boot during extreme axle oscillation.

FIGS. 1 to 3 of the accompanying drawings show prior art rocker arrangements. The arrangement just described is shown in FIG. 1. This connection has become popular since it allows the spring to twist sideways (i.e. when one end of the axle is caused to move up or down relative to the other end) and requires less maintenance than the pin and shackle arrangement.

However, this type of slipper connection has certain disadvantages. Firstly, since the spring end is free to move up and down inside the boot, it tends to chatter and create a lot of noise when the vehicle is running empty and can also allow the axles to hop under braking. Secondly, because the spring camber changes under load deflection it is difficult to ensure that the hook catches on the keeper bolt under all conditions. Consequently, the spring end often comes out of the boot, or alternatively, the keeper bolt becomes jammed between the leaves of the spring.

The spring end normally rests against a contact point at an upper part of the boot and various attempts have been made to keep the spring end in constant contact with the contact point. One method is to attach the spring end to the contact point by a pliable material such as rubber or polyurethane but to date none of these connections have been strong enough to be of practical use.

In an attempt to overcome this problem, the present applicants have adopted the arrangement shown in FIGS. 2 and 3 of the prior art drawings. In this case, an extra long leaf with a hooked end is provided at the bottom of the spring and exerts a pressure on the top of the keeper bolt which pushes the main leaves of the spring up against the upper contact point (as shown in FIG. 2). This approach also has its problems. The rocker boot has to be enlarged to accommodate the extra spring leaf. Furthermore, as shown in FIG. 3, the keeper bolt tends to foul on this extra leaf on upward oscillation of the rocker. Also, the extra depth of the overall spring hinders sideways twisting of the spring unless the rocker boot is made much wider than the spring.

SUMMARY OF THE INVENTION

The present invention aims to provide a spring assembly which mitigates these problems.

Thus, the present invention provides a spring assembly for a vehicle which comprises a main leaf spring having a hook at one end thereof; the end of the spring being slideably received in a boot; the boot comprising two opposed side members interconnected by an upper transverse member; and resilient retaining means mounted on the boot for preventing accidental withdrawal of the end of the spring from the boot during flexing of the spring, comprising resilient means for biasing the spring into sliding contact with the upper member and retaining means for engaging the hook when one limit of sliding travel is reached.

Generally, the resilient retaining means is a further relatively short leaf spring having a hooked end biased upwardly against the end of the first mentioned main leaf spring. Said further leaf spring biases the main leaf spring upwardly so as to tend to maintain contact between the main spring and the upper boot member. The hooked end of said further leaf spring acts as retaining means for engaging the hook of the main leaf spring. The main spring is normally pressed against the upper member by the hooked end of the further spring, thereby allowing the main spring to slide and ensuring that the hooks engage when the desired limit of travel is reached.

The term "hook" is used broadly herein to indicate a member which will cooperate with another such member to act as a stop and limit sliding travel of the end of the main spring, and to retain the spring end in the boot.

Alternative arrangements are possible. For example, the resilient means may be a coil spring provided with a wear pad which pushes the main spring against the upper member. The resilient means may also be formed of a resilient elastomeric material such as rubber or polyurethane. Generally, such an elastomeric pad would have a metal wear plate to allow the spring to slide relative to the elastomeric material without damaging it.

Said further leaf spring may comprise one or more leaves and is generally fixed to a lower end of the boot e.g. by bolting or welding. When the boot forms part of a rocker, said further leaf spring may have two hooked ends and may be fixed to the boot at a central portion of said further leaf spring. It will be appreciated that the use of said further leaf spring enables existing boots to be modified relatively easily to provide an assembly in accordance with the present invention.

The boot may form part of a rocker arrangement. Alternatively, the boot may be provided at the leading or trailing end of a series of consecutive springs of a multi-axle group.

DESCRIPTION OF A PREFERRED EMBODIMENT

An embodiment of the present invention will now be described with reference to the drawings and to the prior art. In the drawings, FIG. 1 shows a conventional prior art slipper connection in vertical cros-section;

FIGS. 1 to 3 illustrate two prior art arrangements. FIG. 1 shows a conventional slipper connection, whilst FIGS. 2 and 3 show recent attempts by the applicants to overcome problems with the conventional slipper connection.

Figure 1:
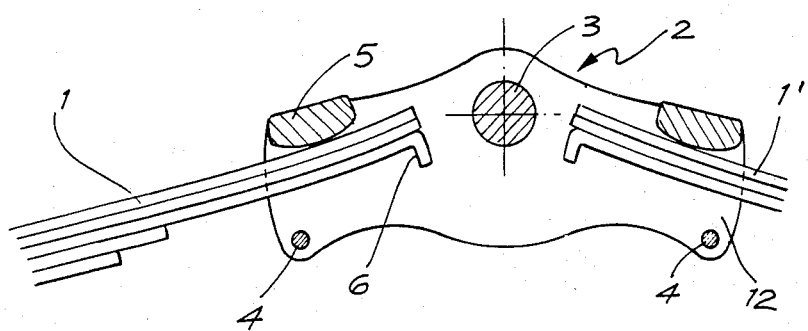

FIG. 1 shows springs 1 and 1' each having one end received within a respective boot of a rocker 2 having a fulcrum 3. Each boot comprises two opposed side members 12 (only one shown) interconnected at an upper end by upper member 5 and at the lower end by keeper pin 4. The rocker comprises two boots, one on each side of the fulcrum. Keeper pins 4 are provided at a lower end of the rocker and cooperate with hook 6 provided at the end of a leaf of the spring 1 for attempting to prevent the end of the spring from withdrawing itself from the boot during extreme oscillation of the rocker. As mentioned earlier, one problem with this conventional arrangement is that, since the spring is not held against the contact point on upper member 5 of the boot, the spring is free to move within the boot and creates a lot of noise, particularly when the vehicle is not loaded. Also, the hook and keeper pin arrangement is not always effective in preventing partial or complete withdrawal of the spring from the boot.

Figure 2:
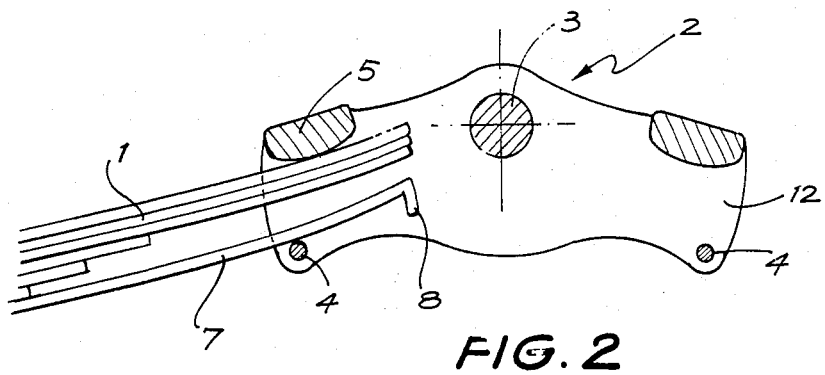
FIG. 2 shows a second prior art arrangement.
Figure 3:
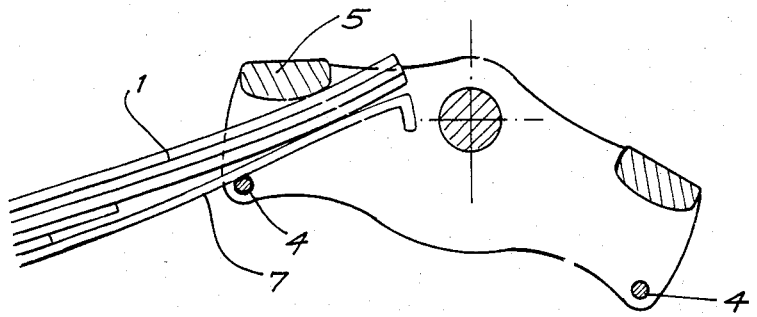
FIG. 3 shows the second prior art arrangement under oscillation.

FIGS. 2 and 3 show an attempt to solve the problems associated with the conventional slipper connection. Thus, a further long lower leaf 7 with a hooked end 8 is attached at the bottom of the leaf spring 1. The leaf 7 tends to push the spring upwardly and maintain contact of the spring 1 with the upper member 5. The keeper pin 4 and hooked end 8 cooperate to prevent accidental withdrawal of the spring from the boot. Whilst this method is fairly successful, it suffers from the disadvantage that on extreme upward oscillation of the rocker end, the spring end becomes pushed so far into the boot that the keeper bolt tends to foul on the lower leaf, as shown in FIG. 3, and the spring end becomes jammed.

Figure 4:
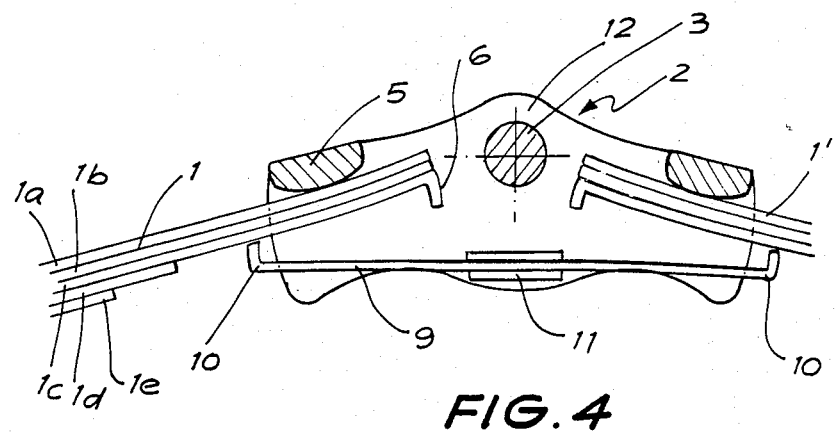
FIG. 4 shows an embodiment of the present invention in vertical cross-section.
Figure 5:
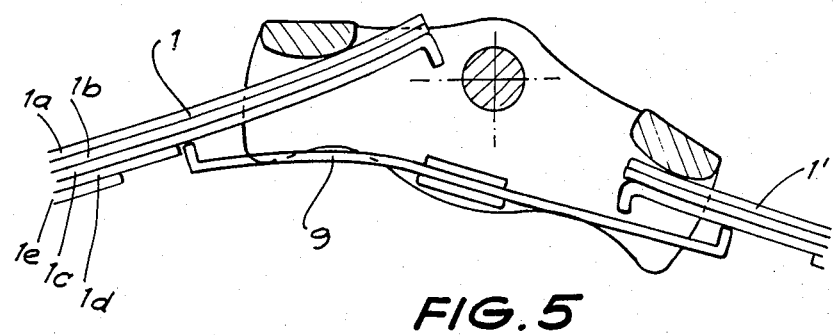
FIG. 5 shows the embodiment of the invention under oscillation.

FIGS. 4 and 5 show an embodiment of the present invention, wherein analogous parts are indicated by the same reference numerals as for the previous Figures.

FIG. 4 shows an arrangement similar to that of FIG. 1, except that there are no keeper bolts and a short keeper spring 9 having hooked ends 10 acting as stops is mounted at a lower end of the rocker 2. The hooks 10 could alternatively be replaced by wear pads or rollers.

The keeper spring 9 is shown having a single leaf, but multiple leafed springs known in the art may be also used. The keeper spring is sandwiched at its central region between a pair of plates 11 usually by bolting. The plates are bolted or welded between the lower ends of the side members 12. The free ends of the keeper spring 9 are thus enabled to flex up and down to accommodate movement of the main spring 1. The hook 10 provided at the end of the keeper spring 9 cooperates with the hook 6 provided at the end of the main spring 1 to prevent accidental withdrawal of the main spring 1 from the boot of the rocker. The keeper spring 9 biases the end of the spring 1 upwardly and holds this in contact with the upper member 5 of the boot in most circumstances.

The keeper spring may be mounted on the plate 11 via an interposed rubber block, if additional resiliency is desired.

Spring 1 as illustrated comprises three full-length upper leaves $1a$, $1b$ and $1c$ and two shorter lower leaves $1d$ and $1e$. Hook 6 is provided on the end of the lowermost full-length leaf, viz leaf $1c$, so as to catch on hook 10. Hook 10 bears against the undersurface of leaf $1c$ as the leaf slides during flexing. During extreme upward flexing of main spring 1, hook 10 may come up against the free end of lower leaf $1d$, which may be so positioned as to act as a stop (see FIG. 5). Sufficient distance must be allowed between hook 6 and the free end of leaf $1d$ to accommodate normal flexing of the main spring 1.

As shown in FIG. 5, the embodiment of the invention enables extreme upward oscillation of the end of the spring 1 to occur without jamming. Accidental withdrawal of the end of spring 1 during extreme downward oscillation of the spring end is prevented by the abutment of the two hooks 6, 10.

We claim:

1. A spring assembly for a vehicle which comprises a main leaf spring having a hook at one end thereof; the end of the spring being slideably received in a boot; the boot comprising two opposed side members interconnected by an upper transverse member; and resilient retaining means mounted on the boot for preventing accidental withdrawal of the end of the spring from the boot during flexing of the spring, including resilient means for biasing the spring into sliding contact with the upper member and retaining means for engaging the hook when one limit of sliding travel is reached; the said resilient retaining means comprising a further leaf spring mounted on the boot at a lower end thereof, the free end of the further spring bearing against the main spring and including a hook for engaging the hook of the main spring.

2. A spring assembly according to claim 1, wherein the main leaf spring comprises a lower leaf having an end which terminates at a distance spaced from the hook of the main spring so as to act as a stop for the hook on said further leaf spring when an opposite limit of the sliding travel is reached.

3. A spring assembly according to claim 1, for a vehicle having two main leaf springs, each having a hook at one end thereof, the ends of the springs being slideably received in two boots forming a rocker assembly with the boots on opposite sides of a fulcrum accepting the respective hooked ends of the two main leaf springs, the further leaf spring having two free ends each comprising a hook and being attached at a central portion to the lower end of the rocker assembly.

* * * * *